(12) United States Patent
Sakoda et al.

(10) Patent No.: US 7,724,377 B2
(45) Date of Patent: May 25, 2010

(54) APPARATUS AND METHOD FOR DETECTING TIRE SHAPE

(75) Inventors: Naokazu Sakoda, Kobe (JP); Eiji Takahashi, Kobe (JP); Tsutomu Morimoto, Kobe (JP); Yasuhiro Matsushita, Takasago (JP); Toshikatsu Nonaka, Takasago (JP); Shiro Horiguchi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 375 days.

(21) Appl. No.: 11/898,906

(22) Filed: Sep. 17, 2007

(65) Prior Publication Data

US 2008/0218742 A1    Sep. 11, 2008

(30) Foreign Application Priority Data

Mar. 8, 2007   (JP) .............................. 2007-059066

(51) Int. Cl.
*G01B 11/24* (2006.01)

(52) U.S. Cl. .................. 356/601; 356/607; 356/612

(58) Field of Classification Search ......... 356/601–623, 356/237.1–237.5; 382/141
See application file for complete search history.

(56) References Cited

U.S. PATENT DOCUMENTS

| 4,783,992 A | * | 11/1988 | Ishibashi ..................... 73/146 |
| 5,485,406 A | * | 1/1996 | Wada et al. ................. 702/167 |
| 5,506,683 A | * | 4/1996 | Yang et al. .................. 356/606 |
| 6,124,925 A | | 9/2000 | Kaneko et al. |
| 2009/0040533 A1 | * | 2/2009 | Takahashi et al. ........... 356/612 |
| 2009/0226073 A1 | * | 9/2009 | Honda et al. ................ 382/141 |

FOREIGN PATENT DOCUMENTS

| JP | 07174528 A | * | 7/1995 |
| JP | 11-138654 | | 11/1997 |

* cited by examiner

*Primary Examiner*—Hoa Q Pham
(74) *Attorney, Agent, or Firm*—Stites & Harbison, PLLC; Juan Carlos A. Marquez, Esq.

(57) ABSTRACT

A tire shape detecting apparatus includes a projector that applies a plurality line light beams in a continuously joined manner, from a direction different from the detection height direction (Z-axis direction) in one light section line, or that applies one line light beam in a condensed manner in the line length direction thereof in order that the one light section line may be formed on the one line Ls on the surface of the tire; and a camera for picking up images of the plurality of line light beams applied to the tire surface in the direction in which the principal ray of each of the plurality of line light beams performs specular reflection with respect to the tire surface, or in the direction in which the principal ray of the condensed one line light beam performs specular reflection with respect to the tire surface.

10 Claims, 4 Drawing Sheets

APPARATUS AND METHOD FOR DETECTING TIRE SHAPE

BACKGROUND OF THE INVENTION

1. Field of the Invention

The present invention related to an apparatus and method for picking up an image of line light applied to the surface of a relatively rotating tire, and for performing shape detection of the tire by the light-section method based on the picked-up image, to thereby detect the surface shape of the tire.

2. Description of the Related Art

The tire has a structure such that various materials such as rubber, chemical fibers, and steel cords are laminated. If there are nonuniform portions in the laminated structure, when air is charged, convex portions referred to as bulges, or concave portions referred to as dents or depressions occur in portions having a relatively low resistance to pressure. Tires causing shape defects such as the aforementioned bulges or dents must be omitted from a shipping object upon being subjected to inspection, from the viewpoint of safety or the viewpoint of the elimination of nonconforming appearance.

Conventionally, the inspection of a tire for shape defects has been made by detecting the surface heights at a plurality of points by means of a contact-type or noncontact-type point measurement sensor while rotating the tire by a rotator, and by detecting the surface shape of the tire based on a distribution of the surface heights. However, in the shape defect inspection based on the shape detection of the tire using the point measurement sensor, the shapes of all faces to be detected for shape defects in the tire cannot be comprehensively detected due to restriction on the number of arranged sensors and restriction on the inspection time. This raises a problem that omission of detection for shape defects is prone to occur.

On the other hand, Japanese Unexamined Patent Application Publication No. 11-138654 discloses a technique for picking up an image of slit light (line light) applied to the surface of a rotating tire, and for performing shape detection of the tire by the light-section method based on the picked-up image, to thereby detect the surface shape of the tire. According to this disclosed technique, it is possible to comprehensively (continuously) detect all faces to be detected (sidewall faces or a tread face of the tire) for shape defects in the tire, thereby allowing the omission of detection for shape defects to be prevented. Here, the term "tread face" refers to a portion of the outer surface of the tire, the portion making contact with a road; and the term "sidewall face" refers to a side portion of the outer surface of the tire, the side portion being located between the tread face and the face of a bead portion, and not making contact with the road.

As shown in the above-described patent document also, in general, when the shape detection is performed by the light-section method, in order that one light section line (a portion to which light is applied, on one line) may be formed on the detection object (sidewall face or the like of the tire), the one line light beam is applied from the detection height direction (direction of the surface height to be detected) in one light section line, and scattered/reflected light beams are captured by a camera arranged in a specific direction to thereby pick up an image of the linear line light.

Meanwhile, the tire surface (especially sidewall faces) is not only of black color but also is highly glossy, and the percentage of the line light applied to the tire surface being scattered/reflected is relatively low. Also, since the tire surface (especially sidewall faces) has a mountain-like shape on the whole, it is necessary to stop down the aperture of a camera in order to obtain a required depth of field.

Therefore, in the surface shape detection disclosed in the foregoing patent document, in order to obtain a clear image of the line light applied to the tire surface, it is necessary to increase the intensity (light quantity) of the line light, or to reduce the image-pickup rate of the camera (i.e., decrease the shutter speed) to thereby increase the exposition time.

However, increasing the intensity of the line light has caused a problem that the tire, which is black and prone to absorb light, may suffer a thermal failure. Furthermore, using a high-power light source (typically, a laser light source) requires a cooling apparatus, thereby resulting in an upsized apparatus, an increased cost, and deteriorated maintenance.

Moreover, when attempting to pick up images of line light beams in the circumferential direction of a rotating tire with a sufficient spatial resolution within a limited time period permitted for a product inspection, undesirably, it is not possible to reduce the image pickup rate (number of image pickups per unit time) of a camera to an image pickup rate low enough to obtain clear images of the line light beams.

For example, the inspection time permitted for a shape defect inspection is about 1 second. Also, in the shape detection of the tire by the light-section method, in order to mutually distinguish the image of line light and the character inscribed on the tire surface from each other, it is necessary to perform an image pickup with a fine spatial resolution of not more than the line width (about 1 mm) of the character. To meet these requirements of the inspection time and the spatial resolution, the image pickup must be performed at 2000 frames per second regarding tires for a passenger car, and 4000 frames per second regarding larger tires for a truck or a bus. However, when performing an image pickup at an image pickup rate as high as 4000 frames per second, the technique disclosed in the foregoing patent document cannot achieve clear images of line light beams.

SUMMARY OF THE INVENTION

Accordingly, it is an object of the present invention to provide a tire shape detecting apparatus and method capable of obtaining a clear image of line light applied to the surface of the tire, even if the image-pickup of the line light is performed at a sufficiently high image pickup rate (e.g., 4000 frames or more per second) without increasing the intensity of the line light, when an image of the line light applied to the surface of the tire, which is black and glossy, is picked up to thereby detect the surface shape of the tire by the light-section method based on the picked-up image.

In order to achieve the above-described object, in a first aspect, the present invention provides a tire shape detecting apparatus that picks up an image of line light applied to the surface of a relatively rotating tire and that performs shape detection by the light-section method based on the picked-up image to thereby detect the surface shape of the tire, the tire shape detecting apparatus including components shown in the following items (1) and (2).

(1) line light irradiation means for applying a plurality line light beams in a continuously joined manner, from a direction different from the detection height direction in one light section line in order that the one light section line may be formed on the surface of the tire; and (2) image pickup means for picking up images of the plurality of line light beams applied to the surface of the tire in the direction in which the principal ray of each of the plurality of line light beams performs specular reflection with respect to the surface of the tire.

When the line light is applied to the black, glossy surface of the tire, the light quantity of specular reflection light is larger than that of scattered/reflected light that heads for a specific direction (image pickup range of the camera). Also, since the surface of the tire 1 (especially, sidewall faces) is curved, even if the image of one line light that is large in line length is picked up by the above-described image pickup means in the specular reflection direction of the principal ray of the line light, the specular reflection light beams of light beams that are apart from the principal ray toward both outer sides, out of the line light beams, do not arrive at the image pickup means. Regarding portions that are apart from the center, out of the entire image of the line light, the light quantity of reflected light beams to arrive at the image pickup means is insufficient to obtain a clear image.

In contrast, the tire shape detecting apparatus according to the first aspect of the present invention picks up an image of the line light by the above-described image pickup means arranged in the specular reflection direction of the line light applied to the tire surface, and therefore, even if the image of the line light is picked up at a sufficiently high image pickup rate (e.g., 4000 frames or more per second) without increasing the intensity of the line light, a clear image of the line light applied to the tire surface can be achieved. Furthermore, the tire shape detecting apparatus according to the first aspect of the present invention applies a plurality of line light beams that are small in the line length, in a continuously joined manner, to the surface of the tire, and the image pickup means is located in the specular reflection direction of the principal ray of each of the plurality of line light beams, and hence, clear images can be obtained for all images of the plurality of line light beams.

Here, the term "relatively rotating tire" includes not only the case where a tire itself rotates about the rotational axis thereof, but also the case where the tire itself is fixed and the tire shape detecting apparatus rotates about the rotational axis of the tire.

It is more preferable that the tire shape detecting apparatus according to the first aspect of the present invention further include a component shown in either one of the following items (3) and (4):

(3) collimating means for collimating each of the plurality of line light beams applied, by the line light irradiation means, to the surface of the tire in the line length direction of each of the plurality of line light beams.

(4) condensing means for condensing each of the plurality of line light beams applied, by the line light irradiation means, to the surface of the tire in the line length direction of each of the plurality of line light beams.

Thereby, even when the length of each of the plurality of line light beams applied to the curved surface of tire is made somewhat longer, the specular reflection direction of light beams that are apart from the principal ray toward both outer sides, can be gotten close to the image pickup means. This allows the number of line light beams to be small, thereby simplifying the apparatus.

In a second aspect, the present invention provides a tire shape detecting apparatus that picks up an image of line light applied to the surface of a relatively rotating tire and that performs shape detection by the light-section method based on the picked-up image to thereby detect the surface shape of the tire, the tire detecting apparatus including components shown in the following items (5) and (6):

(5) line light irradiation means for applying one line light beam in a condensed manner in the line length direction thereof, from a direction different from the detection height direction in one light section line in order that the one light section line may be formed on the surface of the tire; and (6) image pickup means for picking up an image of the line light applied to the surface of the tire in the direction in which the principal ray of the line light performs specular reflection with respect to the surface of the tire.

In such a tire shape detecting apparatus according to the second aspect of the present invention, since the image of line light is picked up by the image pickup means arranged in the specular reflection direction of line light applied to the surface of the tire as well, a clear image of the line light applied to the tire surface can be obtained at a sufficiently high image pickup rate (e.g., 4000 frames or more per second) without increasing the intensity of the line light. Moreover, in the tire shape detecting apparatus according to the second aspect of the present invention, since the line light is applied to the tire surface in a condensed manner in the line length direction thereof, the arrangement can be made such that all (including the principal ray) of the line light beams applied to the tire surface (e.g., sidewall faces), which is curved convex surface, perform specular reflection in substantially the same direction, and since the image pickup means is located in the specular reflection direction of principal ray of the line light beams, clear images can be achieved for all of the line light beams.

The tire shape detecting apparatus according to the present invention (including the first and second aspects) may further include a plurality of combinations of the line light irradiation means and the image pickup means that applies the line light and pick up the image of the line light, in parallel with each one of a plurality of faces on the tire.

This allows the shape detection of a plurality of faces of a tire (e.g., sidewall faces and tread face) to be simultaneously performed, thereby shortening the time required for the shape detection of all faces to be detected of the tire.

Here, it is preferable that each of the plurality of line light irradiation means corresponding to a respective one of the plurality of faces on the tire output respective one of the line light beams with wavelength different from each other.

In this case, for example, regarding the picked-up image of each of the plurality of image pickup means, the image of a respective one of the wavelengths (colors) may be extracted as an image of the line light by predetermined image processing means. Alternatively, in the optical path of incident light on each of a plurality of the image pickup means, the tire shape detecting apparatus may include an optical filter that selectively allows light with a corresponding wavelength to pass.

Thereby, regarding a plurality of faces of the tire, it can be prevented that in the shape detection of a face, line light that is being used for another face becomes noise light for the above-described face.

In the shape detection of a tire sidewall face on which characters are inscribed, as described before, in order to distinguish the image of line light from the characters, it is necessary to ensure a high spatial resolution by picking up an image at a high image pickup rate. The present invention is suitable for the application to such detection objects.

Therefore, it is preferable that the tire shape detecting apparatus according to the present invention include such a construction as follows:

a construction in which the line light irradiation means include first line light irradiation means for applying line light (one that is obtained by continuously joining a plurality of line light beams or one that is obtained by condensing a plurality of line light beams in the line length direction) from a direction different from the detection height direction in one light section line in order that the one light section line may be formed along the radial direction in a sidewall face of the tire; and in which the image pickup means include first image pickup means for picking up images of the line light beams applied to the sidewall faces of the tire by the first line light irradiation means.

This allows the shape of sidewall faces of tire to be detected at a high speed and a high spatial resolution.

Also, the tire shape detecting apparatus according to the present invention may include such a construction as follows: a construction in which the line light irradiation means includes second line light irradiation means for applying line light in a continuously jointed manner from a direction different from the detection height direction in one light section line in order that the one light section line may be formed along the direction orthogonal to the circumferential direction of the tire in the tread face of the tire; and in which the image pickup means includes second image pickup means for picking up images of the plurality of line light beams applied to the tread face of the tire by the second line light irradiation means, in the direction in which the principal ray of each of the plurality of line light beams performs specular reflection with respect to the tread surface.

The present invention can also be understood as a tire shape detecting method wherein, using the above-described tire shape detecting apparatus, an image of line light applied to the surface of a relatively rotating tire is picked up, and shape detection of the tire is performed by the light-section method based on the picked-up image, to thereby detect the surface of the tire.

That is, in a tire shape detecting method according to a first aspect of the present invention, line light irradiation means for applying a plurality line light beams in a continuously joined manner from a direction different from the detection height direction in one light section line in order that the one light section line may be formed on the surface of the tire, and image pickup means for picking up images of the plurality of line light beams applied in a continuously joined manner to the surface of the tire are held so that a visual field range of the image pickup means is located in the direction in which light along the principal ray of each of the plurality of line light beams performs specular reflection with respect to the surface of the tire. In this state where the line light irradiation means and the image pickup means are held as described above, images of the plurality of line light beams are picked up by the image pickup means while applying the plurality line light beams in a continuously joined manner to the surface of the tire by the line light irradiation means.

Also, in a tire shape detecting method according to a second aspect of the present invention line light irradiation means for applying one line light beam in a condensed manner in the line length direction thereof from a direction different from the detection height direction in one light section line in order that the one light section line may be formed on the surface of the tire, and image pickup means for picking up an image of the line light beam applied to the surface of the tire are held so that a visual field range of the image pickup means is located in the direction in which the principal ray of line light beam performs specular reflection with respect to the surface of the tire. In the state where the line light irradiation means and the image pickup means are held as described above, an image of the line light is picked up by the image pickup means while applying the line light to the surface of the tire by the line light irradiation means.

Thereby, the tire shape detecting method according to the present invention has the same effects as those of the tire shape detecting apparatus according to the present invention.

According to the present invention, when an image of line light applied to the surface of a black, glossy tire is picked up, and shape detection is performed by the light-section method based on the picked-up image, to thereby detect the surface shape of the tire, it is possible to obtain a clear image of the line light applied to the surface of the tire even if the image-pickup of the line light is performed at a sufficiently high image pickup rate (e.g., 4000 frames or more per second without enhancing the intensity of the line light. This allows the surface shape of the tire to be detected with a high speed and a high spatial resolution, without causing a thermal failure to the tire.

DESCRIPTION OF THE PREFERRED EMBODIMENTS

Hereinafter, embodiments of the present invention will be described with reference to the accompanying drawings, for the purpose of providing an understanding of the invention. The embodiments below are provided as illustrative examples that embody the present invention, and are not of such a character that limits the technical scope of the present invention.

Figure 1:
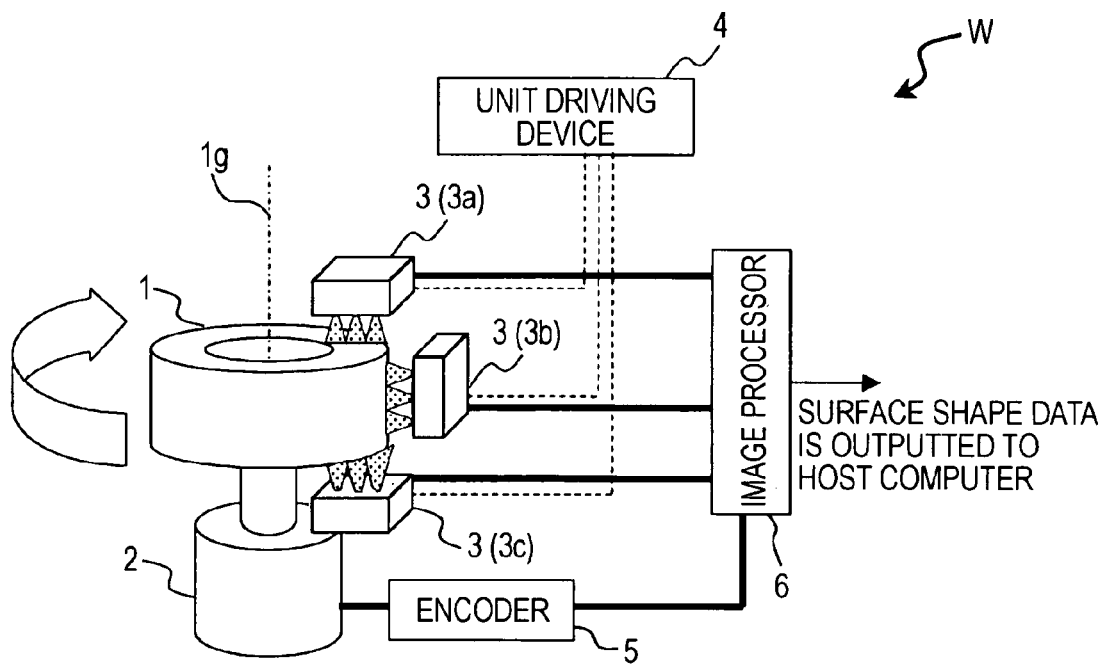
FIG. 1 is a schematic diagram showing the construction of a tire shape detecting apparatus W according to an embodiment of the present invention.
Figure 2:
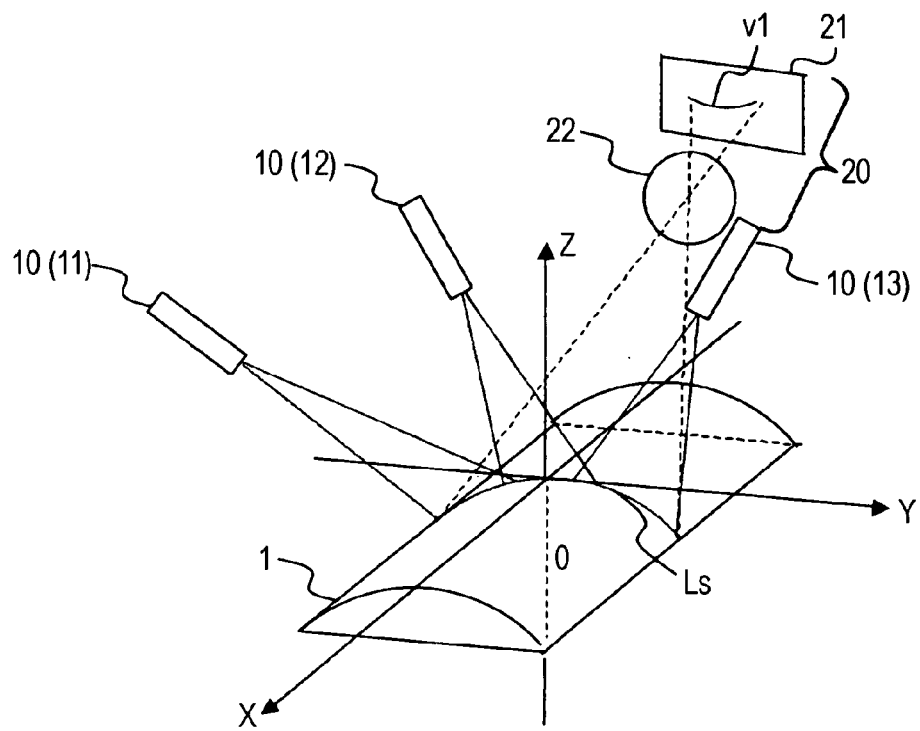
FIG. 2 is a schematic diagram showing three-dimensional installation of light sources and a camera in a sensor unit included in the tire shape detecting apparatus W.
Figure 3A:
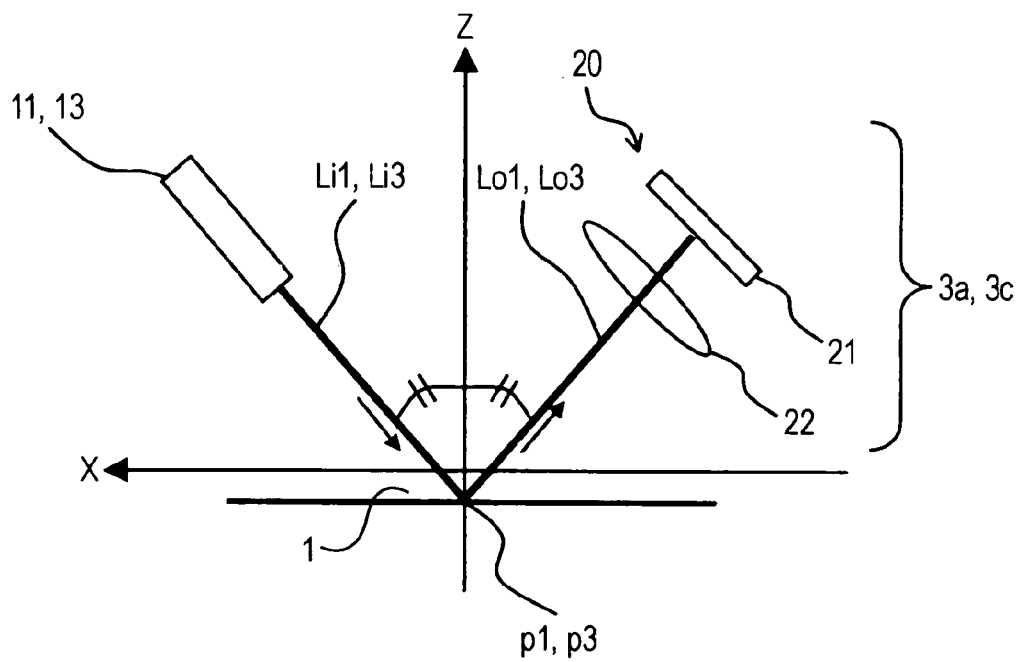
FIGS. 3A and 3B are schematic diagrams each showing the installation of the source(s) of light and the camera in sensor unit(s), when viewed from a specific direction (Y-axis direction)
Figure 3B:
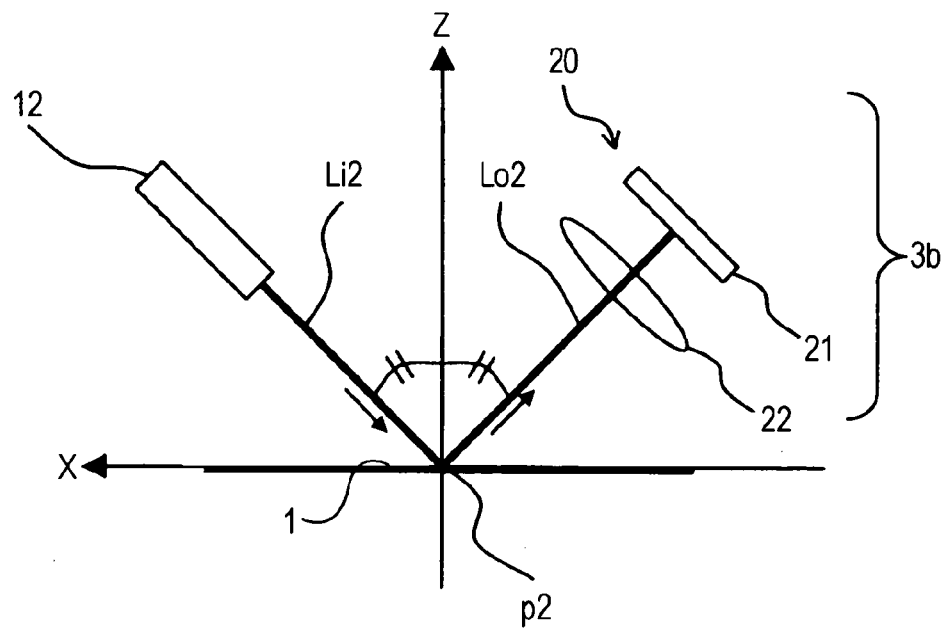
Figure 4A:
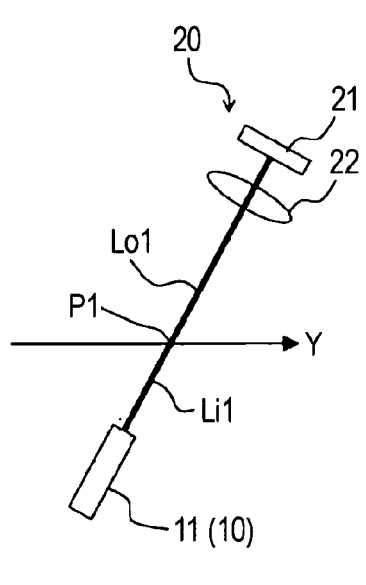
FIGS. 4A, 4B, and 4C are schematic diagrams each showing the installation of the source of light and the camera in the sensor unit, when viewed from a perpendicular direction to the surface of the tire at the position at which the principal ray of the line light arrives.
Figure 4B:
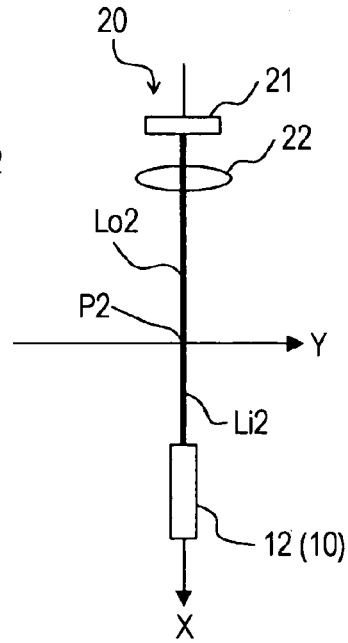
Figure 4C:
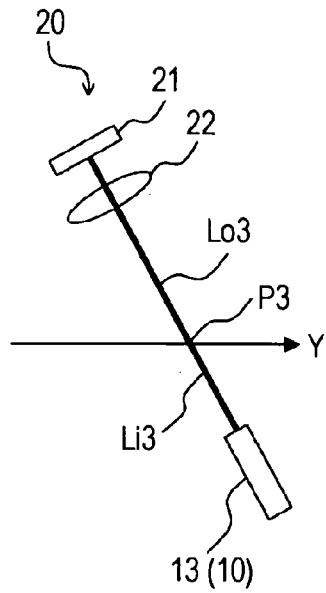
Figure 5:
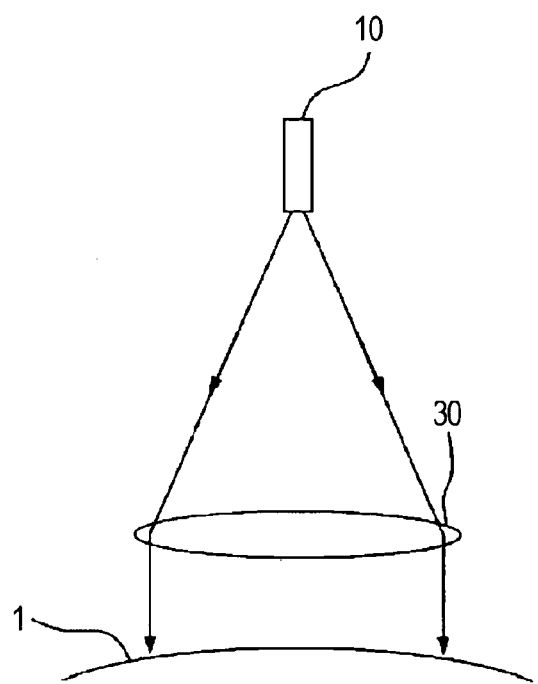
FIG. 5 is a schematic diagram showing how line light beams are collimated in the sensor unit.
Figure 6:
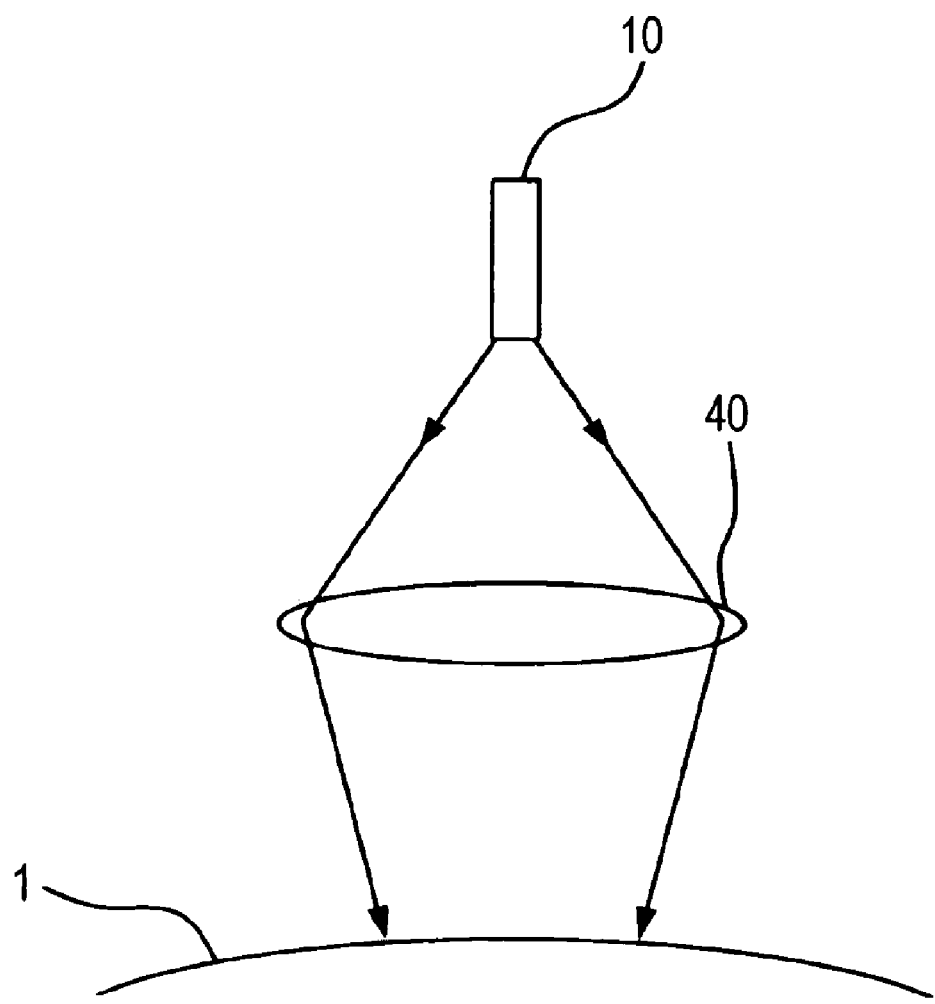
FIG. 6 is a schematic diagram showing how line light beams are condensed in the sensor unit.

Here, FIG. 1 is a schematic diagram showing the construction of a tire shape detecting apparatus W according to an embodiment of the present invention; FIG. 2 is a schematic diagram showing three-dimensional installation of light sources and a camera in a sensor unit included in the tire shape detecting apparatus W; FIGS. 3A and 3B are schematic diagrams each showing the installation of the source(s) of light and the camera in sensor unit(s), when viewed from a specific direction (Y-axis direction); FIGS. 4A, 4B, and 4C are schematic diagrams each showing the installation of the source of light and the camera in the sensor unit, when viewed from a perpendicular direction to the surface of the tire at the position at which the principal ray of the line light arrives; FIG. 5 is a schematic diagram showing how line light beams are collimated in the sensor unit; and FIG. 6 is a schematic diagram showing how line light beams are condensed in the sensor unit.

First, referring to FIG. 1, the overall construction of the tire shape detecting apparatus W according to the present invention is explained.

The tire shape detecting apparatus W according to the present invention is an apparatus that picks up an image of line light applied to the surface of a rotating tire 1 by a camera, and that performs shape detection by the light-section method based on the picked-up image, to thereby detect the surface shape of the tire 1.

As shown in FIG. 1, the tire shape detecting apparatus W includes a tire rotator 2, sensor units 3, a unit driving device 4, an encoder 5, and an image processor 6.

The tire rotator 2 is a rotational device, such as a motor, that rotates the tire 1 to be subjected to shape detection, about the rotational axis 1g of the tire 1. For example, the tire rotator 2 rotates the tire 1 at a rotational speed of 60 rpm. Thereby, during one second during which the tire 1 is rotated once, the tire shape detecting apparatus W detects the surface shape over the entire circumference range of a tread face and sidewall faces of the tire 1 by the sensor units 3 to be described later.

The sensor unit 3 is a unit that incorporates therein a light source for applying line light to the surface of the rotating tire 1, a camera for picking up an image of line light on the surface of the tire 1, etc. In this embodiment, there are provided three sensors: two sensor units 3a and 3c that are used for measuring the shape of two sidewall faces of the tire 1, and one sensor unit 3b for measuring the shape of the tread face of the tire 1. Details of these sensor units 3 will be given later.

The unit driving device 4 movably supports each of the sensor units 3 using a driving device such as a servomotor as a drive source, and positions each of the sensor units 3 with respect to the tire 1. In response to an operation with respect to a predetermined operation portion, or in response to a control command from an external device, the unit driving device 4 positions each of the sensor units 3 at a predetermined retraction position separated from the tire 1 before the tire 1 is mounted/demounted with respect to the tire rotator 2, and after the tire 1 has been mounted to the tire rotator 2, the unit driving device 4 positions each of the sensor units 3 at a predetermined inspection position in the proximity of the tire 1.

The encoder 5 is a sensor for detecting the rotational angle of the rotational shaft of the tire rotator 2 for the tire 1, i.e., the rotational angle of the tire 1, and the detection signal of the sensor is used for controlling the image pickup timing of the camera included in each of the sensor units 3.

The image processor 6 performs shutter control (control of the image pickup timing) of the camera included in each of the sensor units 3, based on the detection signal from the encoder 5. For example, the image processor 6 performs control for releasing the shutter of the camera every time the encoder 5 detects that the tire 1 rotating at the speed of 60 rpm rotates by 0.09° (=360°/4000). As a result, image pickups are performed at an image pickup rate of 4000 frames per second.

Furthermore, the image processor 6 inputs images picked up by the cameras included in the sensor units 3, that is, data on the picked up images of line light beams applied to the surface of the tire 1. Based on the picked up images, the image processor 6 performs a shape detection processing by the light-section method, and outputs shape data (data showing height distribution of the surface of the tire 1) as detection results, to a host computer (not shown). In this case, regarding sidewall faces of the tire 1, the image processor 6 removes images of characters inscribed on the tire to thereby extract only the images of the line light beams by performing a predetermined image processing. Based on the picked up images of the line light beams, the image processor 6 executes the shape detection processing by the light-section method. This image processor 6 is implemented by a digital signal processor (DSP).

Then, the above-described host computer determines whether the surface shape detected for each of the faces of the tire 1 satisfies an allowable condition preset for each of the faces of the tire 1, and displays the determination results to a predetermined display portion, or outputs them as predetermined control signals.

Since the shape detection processing by the light-section method is well known, it is here omitted from description.

Next, referring to FIGS. 2 to 4, the sensor units 3 are explained.

As shown in FIG. 2, the sensor unit 3 includes a plurality of projectors 10 each outputting line light, and a camera 20.

In FIG. 2, an X-axis denotes a direction tangent to the rotational circumference of the tire in a shape detection position on the tire 1, a Z-axis denotes a detection height direction (direction of the surface height to be detected) in the shape detection position on the tire 1, and a Y-axis denotes a direction orthogonal to the X-axis and the Z-axis.

That is, in the sensor units 3a and 3c used for the shape detection of sidewall faces of the tire 1, the Z-axis is a direction of the rotational axis 1g of the tire 1, and the Y-axis is a radial direction of the tire 1 (i.e., the direction normal to the rotational axis 1g of the tire 1).

Also, in the sensor unit 3b used for the shape detection of a tread face of the tire 1, the Z-axis is a radial direction of the tire 1, and the Y-axis is a direction of the rotational axis 1g of the tire 1.

The projector 10 includes a plurality (in FIG. 2, three) of line light sources 11 to 13. In order that one light section line may be formed on one line Ls on the surface of the tire 1, the projector 10 applies, by the plurality of line light sources 11 to 13, a plurality of line light beams in a continuously joined manner from a direction different from the detection height direction (Z-axis direction) in the one line Ls (light section line), that is, one line light beam viewed as a whole is applied in a continuously joined manner so that the ends of mutually adjacent line light beams are superimposed on each other. This is an example of the above-described line light irradiation means.

The camera 20 includes a camera lens 22 and an image pickup device (light receiving portion) 21, and is used for picking up images v1 (image of light section line on the one line Ls) of the plurality of line light beams applied to the surface of the tire 1 in a continuously joined manner.

Therefore, in the sensor units 3a and 3c for sidewall faces in order that one light section line may be formed on one line Ls along the radial direction (Y-axis direction) of the tire 1 on the sidewall face of the tire 1, the projector 10 applies a plurality line light beams in a continuously joined manner from a direction different from the detection height direction (Z-axis direction) in the one line Ls (light section line). This is an example of the above-described first line light irradiation means.

On the other hand, in the sensor unit 3b for tread face, in order that light section line may be formed one line Ls along the direction orthogonal to the circumferential direction of the tire 1 in the tread face of the tire 1, the projector 10 applies a plurality line light beams in a continuously joined manner from a direction different from the detection height direction (Z-axis direction) in the one line Ls (light section line). This is an example of the above-described second line light irradiation means.

In the present embodiment, it is exemplified that three line light beams are applied to each of the faces of the tire 1 (i.e., for each of the sensor units 3). However, by increasing or decreasing the number of the line light sources 11 to 13, two line light beams, or four or more line light beams may be applied to each of the faces of the tire 1.

The projector 10 and the camera 20 are held by a holding mechanism (not shown) so that a visual field range of the camera 20 is located in the direction in which the principal ray (light along the center line) of each of the plurality of line light beams outputted from the line light sources 11 to 13 performs specular reflection with respect to the surface of the tire 1. As a consequence, the camera 20 picks up images of the plurality of line light beams applied to the surface of the tire in the direction in which the principal ray of each of the plurality of line light beams performs the specular reflection with respect to the surface of the tire 1. This is an example of the above-described image pickup means. For example, the positional relationship between the projector 10 and the camera 20 may be designed by a process wherein firstly the position and the orientation of the camera 20 are set in a direction different from the detection height of the light section line, and thereupon the position and the orientation of each of the line light sources 11 to 13 in the projector 10 is set so that the specular reflection light of each of the line light beams heads for the image pickup range of the camera 20. Of course, the positional relationship between the projector 10 and the camera 20 may be set in the reverse procedure to the forgoing.

That is, the cameras 20 in the sensor units 3a and 3c for sidewall faces each pick up images of a plurality of line light beams applied to the sidewall faces of the tire 1 by the line light sources 11 to 13, in the direction in which the principal ray of each of the plurality of line light beams performs specular reflection with respect to the sidewall face of the tire. This is an example of the first image pickup means.

Also, the camera 20 in the sensor unit 3b for tread face picks up images of a plurality of line light beams applied to the tread face of the tire 1 by the line light sources 11 to 13, in the direction in which the principal ray of each of the plurality of line light beams performs specular reflection with respect to the tread face of the tire. This is an example of the second image pickup means.

FIGS. 3 and 4 are schematic diagrams each showing the installation of the line light sources 11 to 13 and the camera 20. Here, FIG. 3 shows a state when viewed from the Y-axis direction, and FIG. 4 shows a state when viewed from the direction perpendicular to the tire surface at positions P1, P2, and P3 (hereinafter referred to as "principal ray arrival positions") at which respective principal rays of the line light beams arrive. FIGS. 3A, 4A, and 4C are diagrams of the sensor units 3a and 3c for sidewall faces, and FIGS. 3B and 4B are each diagrams of the sensor units 3b for tread face.

As shown in FIGS. 3A and 3B, in the sensor unit 3 with respect to any of sidewall faces and a tread face, the line light sources 11 to 13 and the camera 20 are held so that, when viewed from the Y-axis direction, the angles that respective principal rays Li1, Li2 and Li3 of the plurality of line light beams form with respect to the Z-axis (or the angles that these principal rays form with respect to the surface of the tire 1), become equal to the angles that the line connecting the principal ray arrival positions P1, P2 and P3 corresponding to the principal rays Li1, Li2 and Li3, and the center of the image pickup device 21 of the camera 20 (hereinafter, this line is referred to as image pickup center lines Lo1, Lo2, and Lo3) form with respect to the Z-axis (or the angles that these image pickup center lines form with respect to the surface of the tire 1).

As shown in FIGS. 4A to 4C, in the sensor unit 3 with respect to any of sidewall faces and a tread face, the line light sources 11 to 13 and the camera 20 are held so that, when viewed from the direction perpendicular to the tire surface at the at the principal ray arrival positions P1, P2, and P3, the respective principal rays Li1, Li2 and Li3 of the plurality of line light beams and the corresponding image pickup center lines Lo1, Lo2 and Lo3 form a single line.

The above-described positional relationship between the projector 10 and the camera 20 has been shown as a positional relationship to be set with reference to the tire surface at which the principal rays arrive (i.e., the faces of the principal ray arrival positions P1, P2 and P3). This positional relationship does not mean that the positions of the projector 10 and the camera 20 are set for each tire 1 as a body to be inspected, but means that the positions of the projector 10 and the camera 20 are set with reference to an average surface shape of the tire 1 as an inspection object. For example, an imaginary reference surface representative of an average surface shape of the tire 1 as an inspection object is assumed, and the projector 10 and the camera 20 are held by a predetermined holding mechanism so that an image pickup range of the camera 20 is located in the direction in which the principal ray of each of the plurality of line light beams applied in a continuously joined manner on the surface of the tire 1 performs specular reflection with respect to the above-described reference surface.

As described above, in the tire shape detecting apparatus W, the projector 10 and the camera 20 are held by a holding mechanism (not shown) so that a visual field range of the camera 20 is located in the direction in which the principal ray (light along the center line) of each of the plurality of line light beams performs specular reflection with respect to the surface of the tire 1. In a state where the projector 10 and the camera 20 are held as described above, images of the plurality of line light beams are picked up by the camera 20 while applying the plurality line light beams in a continuously joined manner to the surface of the tire 1.

When the line light is applied to the black, glossy surface of the tire 1, the light quantity of specular reflection light is larger than that of scattered/reflected light that heads for a specific direction (image pickup range of the camera). Also, since the surface (especially sidewall faces) of the tire 1 is curved, even if the image of one line light that is large in line length is picked up by the camera 20 in the specular reflection direction of the principal ray of the line light, the specular reflection light beams that are apart from the principal ray toward both outer sides, out of the line light, do not arrive at the camera 20.

For example, in FIG. 2, when the light outputted from the center line light source 12 is made larger in line length, the specular reflection light of light in the vicinity of both ends in the line light heads for a direction quite different from the direction of the camera 20. As a result, regarding portions that are apart from the center, out of the entire image of the line light, the light quantity of reflected light beams to arrive at the camera 20 becomes insufficient to obtain a clear image.

On the other hand, the tire shape detecting apparatus W picks up an image of the line light by the camera 20 arranged in the specular reflection direction of the line light applied to the surface of the tire 1, and therefore, even if the image of the line light is picked up at a sufficiently high image pickup rate (e.g., 4000 frames or more per second) without increasing the intensity of the line light (without using a high-power line light source), a clear image of the line light applied to the tire surface can be achieved. Furthermore, by the plurality of line light sources 11 to 13, a plurality of line light beams that are relatively small in line length are applied in a continuously joined manner to the tire surface, and the camera 20 is located in the specular reflection direction of the principal ray of each of the plurality of line light beams, and hence, clear images can be obtained for all images of the plurality of line light beams that are continuously jointed. This allows the surface shape of the tire 1 to be detected with a high speed and a high spatial resolution, without causing a thermal failure to the tire.

Also, the tire shape detecting apparatus W includes a plurality of sensor units 3 each having a combination of the projector 10 (line light irradiation means) and the camera 20, and the plurality of sensor units 3 perform the application of line light by the projector 10 and the pickup of the image of the line light by the camera 20, in parallel with each of the plurality of faces (front and back sidewall faces and tread face) on the tire 1. This allows the shape detection of the plurality of faces of the tire (sidewall faces and tread face) to be simultaneously performed, thereby shortening the time required for the shape detection of all faces to be detected of the tire 1.

As shown in FIG. 5, the tire shape detecting apparatus W according to the embodiment of the present invention may include a collimating lens 30 (corresponding to the above-described collimating means) for collimating each of the plurality of line light beams applied to the surface of the tire in the line length direction thereof by the projector 10 (an example of the above-described line light irradiation means).

Alternatively, as shown in FIG. 6, the tire shape detecting apparatus W may include a condenser lens 40 (corresponding to the above-described condensing means) for condensing each of the plurality of line light beams applied to the surface of the tire in the line length direction thereof by the projector 10 (an example of the above-described line light irradiation means).

By providing these collimating lens 30 and condenser lens 40, even when the length of each of the plurality of line light beams applied to the curved surface of the tire 1 is made somewhat larger, the specular reflection direction of light beams that are apart from the principal ray toward both outer sides, can be gotten close to the direction of the image pickup range of the camera 20. This allows the number of line light beams to be small, thereby simplifying the apparatus.

In the above-described embodiment, the projector 10 including the plurality of light sources (the above-described line light sources 11 to 13) have been shown. However, as a projector for applying a plurality of line light beams in a continuously joined manner to the tire surface in order that one light section line may be formed on the tire surface, alternative constructions are conceivable.

One possible embodiment may be such that the projector 10 includes one line light source, and an optical device for branching line light beam emitted from the line light source into a plurality of line light beams, and for applying the plurality of line light beams after having been branched, in a continuously joined manner, to the tire surface in order that the one light section line may be formed on the tire surface. This allows the number of light sources to be reduced.

Another possible embodiment may be such that the tire shape detecting apparatus W according to the embodiment of the present invention includes, instead of the above-described projector 10, a projector (hereinafter referred to as projector 10') that has the following construction in which the construction of the projector 10 is partly changed.

The projector 10' includes a light source (corresponding to the line light source 12) for outputting one line light beam, and a condenser lens 40 for condensing the one line light beam in the line length direction as shown in FIG. 6. In order that a light section line is formed on the above-described one line Ls on the tire surface, the projector 10' condenses and applies one line light beam in the line length direction thereof, from a direction different from the detection height direction in the one line Ls (light section line).

In this case, the camera 20 picks up an image of the line light applied to the tire surface in the direction in which the principal ray of the line light outputted from the projector 10' performs specular reflection with respect to the tire surface. That is, the positional relationship between the projector 10' and the camera 20 is adjusted so that the visual field range of the camera 20 is located in the direction in which the principal ray of the line light outputted from the projector 10' performs the specular reflection with respect to the tire surface.

Also in the tire shape detecting apparatus including such a projector 10', an image of line light is picked up by the camera 20 arranged in the specular reflection direction of the line light applied to the tire surface, and therefore, even if the pickup of an image of line light is performed at a sufficiently high image pickup rate, it is possible to obtain a clear image of the line light applied to the tire surface, without the need to enhance the intensity of the line light. Moreover, regarding the projector 10', since the line light is applied to the tire surface while condensing the line light in the line length direction thereof, the projector 101 can be configured so that all of the line light beams (including the principal ray) applied to the tire surface (such as a side wall face) that is curved convex surface, performs specular reflection in substantially the same direction. Herein, since the camera 20 is located in the specular reflection direction of the principal ray of line light beams, clear images can be obtained for all images of the line light beams.

Additionally, the plurality of the projectors 10 arranged for each of the faces to be inspected of the tire 1 may include the line light sources 11 to 13 for outputting line light beams having mutually different wavelengths for each of the faces to be inspected.

In this case, regarding each of the plurality of sensor units 3, in the optical path of incident light to the camera 20, there is provided an optical filter for selectively passing light with a predetermined wavelength outputted by the projector 10 corresponding to the camera 20.

For example, the projectors 10 in the sensor units 3a to 3c may output line light beams with wavelengths of 650 nm, 670 nm and 690 nm, respectively, and band-pass filters for selectively passing light beams with wavelengths of 650±5 nm, 670±5 nm and 690±5 nm, respectively, may be provided in the front of the camera 20 for picking up images of the line light beams.

This prevents that in the shape detection of a face on the tire 1, line light that is being used in another face becomes noise light for the above-described face.

Furthermore, the plurality of the projectors 10 may output respective line light beams with mutually different colors (wavelengths), and regarding a picked-up image (color image) of each of the cameras 20 that pick up color images, the image processor 6 may extract an image of a respect one of the colors (wavelengths) as an image of line light.

In the above-described embodiment, an example has been shown in which the shape detection is performed while rotating the tire 1 by the tire rotator 2 about the rotational axis 1g.

However, the arrangement may also be such that, with the tire 1 itself fixed, the entire tire shape detecting apparatus W or the sensor units 3 (3a to 3c), which are a part of the apparatus, are rotated by a predetermined rotating mechanism about the rotational axis 1g of the tire 1.

It is preferable that the tire shape detecting apparatus W be provided with a proximity sensor for detecting that the sensor units 3 (3a to 3c) have gotten closer than a predetermined distance, to the tire 1, and that unit driving device 4 have a function of controlling the sensor units 3 (3a to 3c) so as not to make contact with the tire 1, based on the detection results of the proximity sensor.

It is also preferable that a support mechanism for the sensor units 3 (3a to 3c) not only support each of the sensor units 3 (3a to 3c), but also include an arm having a joint portion that bends in a rotational direction of the tire 1 when a force higher than a predetermined value in the rotational direction of the tire 1, or a damper for absorbing the shocks due to the foregoing force.

This prevents the apparatus from being damaged even in the event that the sensor unit(s) 3 make contact with the tire 1.

As described above, the present invention is capable of being applied to a tire shape detecting apparatus.

What is claimed is:

1. A tire shape detecting apparatus that picks up an image of line light applied to the surface of a relatively rotating tire and that performs shape detection by the light-section method based on the picked-up image to thereby detect the surface shape of the tire, the tire detecting apparatus comprising:
    line light irradiation means for applying a plurality line light beams in a continuously joined manner, from a direction different from the detection height direction in one light section line in order that the one light section line is may be formed on the surface of the tire; and
    image pickup means for picking up images of the plurality of line light beams applied to the surface of the tire, in the direction in which the principal ray of each of the plurality of line light beams performs specular reflection with respect to the surface of the tire.

2. The tire shape detecting apparatus according to claim 1, further comprising:
    collimating means for collimating each of the plurality of line light beams applied to the surface of the tire by the line light irradiation means, in the line length direction of each of the plurality of line light beams.

3. The tire shape detecting apparatus according to claim 1, further comprising:
    condensing means for condensing each of the plurality of line light beams applied to the surface of the tire by the line light irradiation means, in the line length direction of each of the plurality of line light beams.

4. The tire shape detecting apparatus according to claim 1, further comprising:
    a plurality of combinations of the line light irradiation means and the image pickup means that applies the line light and pick up the image of the line light, in parallel with each one of a plurality of faces on the tire.

5. The tire shape detecting apparatus according to claim 4, wherein each of the plurality of line light irradiation means corresponding to a respective one of the plurality of faces on the tire outputs respective one of the line light beams with a wavelength different from each other.

6. The tire shape detecting apparatus according to claim 1, wherein the line light irradiation means comprises first line light irradiation means for applying line light from a direction different from the detection height direction in one light section line in order that the one light section line is formed along the radial direction of the tire on a sidewall face of the tire; and
    wherein the image pickup means comprises first image pickup means for picking up an image of the line light applied to the sidewall face of the tire by the first line light irradiation means.

7. The tire shape detecting apparatus according to claim 6, wherein the line light irradiation means comprises second line light irradiation means for applying line light from a direction different from the detection height direction in one light section line in order that the one light section line is formed along the direction orthogonal to the circumferential direction of the tire on a tread face of the tire; and
    wherein the image pickup means comprises second image pickup means for picking up an image of the line light applied to the tread face of the tire by the second line light irradiation means.

8. A tire shape detecting apparatus that picks up an image of line light applied to the surface of a relatively rotating tire and that performs shape detection by the light-section method based on the picked-up image to thereby detect the surface shape of the tire, the tire detecting apparatus comprising:
    line light irradiation means for applying one line light beam in a condensed manner in the line length direction thereof, from a direction different from the detection height direction in one light section line in order that the one light section line is formed on the surface of the tire; and
    image pickup means for picking up an image of the line light applied to the surface of the tire, in the direction in which the principal ray of the line light performs specular reflection with respect to the surface of the tire; and wherein
    a plurality of combinations of the line light irradiation means and the image pickup means that applies the line light and pick up the image of the line light, in parallel with each one of a plurality of faces on the tire.

9. The tire shape detecting apparatus according to claim 8, wherein each of the plurality of line light irradiation means corresponding to a respective one of the plurality of faces on the tire outputs respective one of the line light beams with a wavelength different from each other.

10. A tire shape detecting method for picking up an image of line light applied to the surface of a relatively rotating tire and for performing shape detection of the tire by the light-section method based on the picked-up image to thereby detect the surface of the tire, the tire shape detecting method comprising:
    holding line light irradiation means for applying a plurality line light beams in a continuously joined manner from a direction different from the detection height direction in one light section line in order that the one light section line is formed on the surface of the tire, and image pickup means for picking up images of the plurality of line light beams applied in a continuously joined manner to the surface of the tire so that a visual field range of the image pickup means is located in the direction in which light along the principal ray of each of the plurality of line light beams performs specular reflection with respect to the surface of the tire; and
    picking up images of the plurality of line light beams by the image pickup means in said holding state, while applying the plurality line light beams in a continuously joined manner to the surface of the tire by the line light irradiation means.

* * * * *